United States Patent
Spenke

[15] 3,658,643
[45] Apr. 25, 1972

[54] FAST-BREEDER NUCLEAR REACTOR

[72] Inventor: Hans Spenke, Erlangen, Germany

[73] Assignee: Siemens Aktiengesellschaft, Berlin and Munich, Germany

[22] Filed: Apr. 22, 1969

[21] Appl. No.: 820,038

Related U.S. Application Data

[63] Continuation-in-part of Ser. No. 696,434, Jan. 8, 1968.

[30] Foreign Application Priority Data

Jan. 11, 1967 Germany.................................S 107,812
Apr. 27, 1968 Germany........................P 17 64 235.2

[52] U.S. Cl.................................................176/17, 176/40
[51] Int. Cl..............................................................G21c 1/02
[58] Field of Search.............................................176/17, 18, 40

[56] References Cited

UNITED STATES PATENTS

| | | | |
|---|---|---|---|
| 2,975,117 | 3/1961 | Zinn | 176/40 |
| 3,201,318 | 8/1965 | Dickenson | 176/30 |
| 3,212,982 | 10/1965 | Astley et al. | 176/40 |
| 3,287,224 | 11/1966 | Lowenstein | 176/18 |
| 3,335,060 | 8/1967 | Diener | 176/18 X |

OTHER PUBLICATIONS

Paper No. 57– A1F– 34, " A New Approach to a Materials Testing Reactor," by Gruber, Oct. 1957, pp. 1– 6.

Primary Examiner—Carl D. Quarforth
Assistant Examiner—Harvey B. Behrend
Attorney—Curt M. Avery, Arthur E. Wilfond, Herbert L. Lerner and Daniel J. Tick

[57] ABSTRACT

Fast-breeder nuclear reactor includes a generally cylindrical reactor core having axial end zone of breeder material and a center zone of fissionable fuel, and means for cooling the zones with fluid coolant, the fissionable fuel zone having end surfaces located in opposite axial directions of the cylindrical core symmetrical to a transverse plane through the core bisecting the fissionable fuel zone, the fissionable fuel zone having a thickness in the axial direction of the core reducing in radial direction toward the axis of the core, the fissionable fuel therein having a uniform degree of enrichment.

10 Claims, 8 Drawing Figures

Patented April 25, 1972 3,658,643

FAST-BREEDER NUCLEAR REACTOR

This application is a continuation-in-part of my application, Ser. No. 696,434, filed Jan. 8, 1968.

My invention relates to a fast-breeder nuclear reactor and, more particularly, to such a reactor having steam or fluid metal cooling of the fuel and breeder zones as well as a shape or geometry which effect a reduction in the coolant void coefficients. Such fast-breeder reactors are of the general EBR-2 type constructed by the Argonne National Laboratory.

In fast-breeder reactors there is a fundamental likelihood that a positive reactivity will be produced when there is a loss of coolant from the reactor core, which can cause a power excursion with consequent destruction or damage to the core or other regions of the reactor. This so-called void effect has two main components one of which is based on variation of the neutron energy spectrum and the other on variation in neutron leakage losses, because a variation in the moderating phenomena as well as in the absorption of neutrons results from loss of coolant. It consequently follows that this void effect must be kept as small as possible for reasons of safety. The minimizing of the void effect can be achieved by increasing the neutron leakage losses with the aid of special core geometries such as for example, pancake, annular or modular forms or shapes. In the last-mentioned example of core geometry, the reactor core is composed of individual modules, each of which possesses its own fissionable fuel, breeder material and reflector zones.

A disadvantage of the heretofore and aforementioned constructions for minimizing the void effect is that in all of the proposals to date, the reactor provided with such construction has a relatively poor efficiency.

It is accordingly an object of my invention to provide a fast-breeder nuclear reactor with a core geometry with a local increase in neutron losses only and therewith a decrease in the maximum void effect, which affords an essentially improved reactor efficiency and economy.

With the foregoing and other objects in view I accordingly provide fast-breeder nuclear reactor comprising a generally cylindrical reactor core having axial end zone of breeder material and a center zone of fissionable fuel, and means for cooling the zones with fluid coolant, the fissionable fuel zone having end surfaces located in opposite axial directions of the cylindrical core symmetrical to a transverse plane through the core bisecting the fissionable fuel zone, the fissionable fuel zone having a thickness in the axial direction of the core reducing in radial direction toward the axis of the core.

In accordance with a further recent development of my invention, I provide such a fast breeder reactor wherein the degree of enrichment of the fissionable fuel is uniform in all radially extending regions of the reactor core.

In accordance with yet another feature of my invention, the fissionable fuel zone of the reactor is constructed in a quasihomogeneous manner of laterally open fuel elements i.e., as viewed in cross section, the fissionable fuel zone is made up of equal concentrations of nuclear fuel spaced equidistantly from one another.

In accordance with further features of my invention, the axial end zones of breeder material and the fissionable fuel zones are defined by an assembly of rod-shaped fuel elements having end portions of breeder material and a center portion of fissionable material and, moreover, the fuel elements are disposed substantially parallel to and equally spaced from one another.

Other features which are considered as characteristic for the invention are set forth in the claims.

Although the invention is illustrated and described herein as embodied in fast-breeder nuclear reactor, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
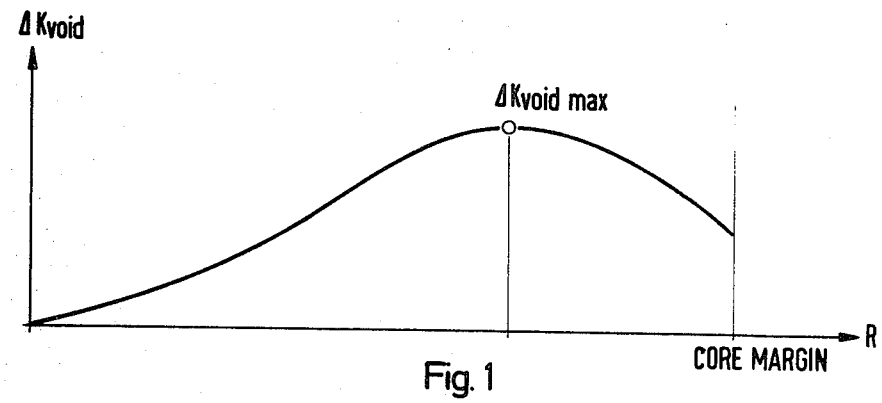
FIG. 1 is a graph showing the principal reactivity curve of a known disc-shaped fast-breeder reactor subjected to uniform coolant losses.

Referring now to the drawings and first particularly to FIG. 1 thereof, there is shown in a plot of incremental coolant void effect ($\Delta k_{void}$) against radial distance R from the center of the core to the marginal edge thereof, that the integration of the void effect over various void zone radii provides a maximum value $\Delta k_{void}$ max. located between the center of the core and the marginal edge thereof, due to the fact that the leakage losses of the neutrons are small in the core center and become increasingly greater as one approaches the marginal edge of the core. This maximum value is of critical importance for reliable operation of a fast-breeder reactor.

My means of the arrangement and relative dimensioning of the reactor core and of the fuel elements comprised by the core, in accordance with the invention of the instant application, the neutron leakage losses are increased in those regions of the core which contribute to an especially great positive extent to the maximal void effect.

The increase and local change of the leakage losses is achieved by reducing the axial thickness of the fissionable fuel region in a direction from the marginal edge toward the center of the cylindrical reactor core and, conversely, by increasing, in a direction from the marginal edge of the reactor core toward the center thereof, the thickness of both of the breeder material regions, as measured in the axial direction of the core. The axial thickness or height, as viewed in FIGS. 2 and 3, of the fuel region may be reduced quantitatively to an extent that the maximal void effect is below the prompt critical value, i.e., below a 1 $ ( = $\beta_{eff}$= portion of the delayed neutrons).

Figure 2:
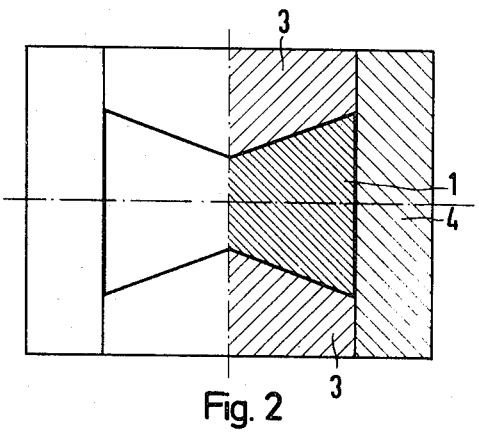
FIGS. 2 and 3 are diagrammatic views, partly in cross section, through two different embodiments of the reactor constructed in accordance with the invention.
Figures 3, 3A, 3B:
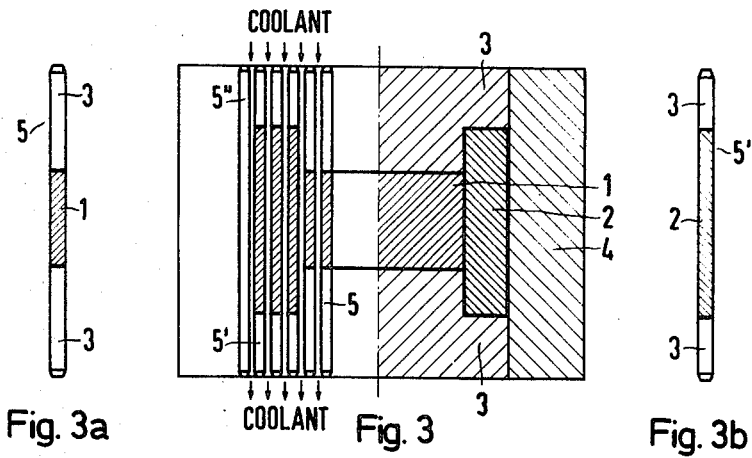
FIGS. 3a and 3b are diagrammatic partly cross-sectional enlarged views of two embodiments of rod-shaped fuel elements used in the reactor of FIG. 3.

In FIG. 2 which shows schematically and partly in cross section an embodiment of a generally cylindrical fast-breeder reactor core according to the invention, the reduction in the axial thickness or height of the fissionable fuel zone 1 is constant in a direction from the marginal or peripheral surface thereof to the center of the nuclear core. Thus the axial end surfaces of the fuel zone have a substantially conical or concave shape. In the corresponding view of the second embodiment of the invention as shown in FIG. 3, the reduction in the thickness or height of the fuel zone 1, 2 is stepwise in a direction from the margin or peripheral surface of the core toward the center thereof. In both FIGS. 2 and 3, the reactor core is shown as having a pair of axially disposed breeder material covers or end zones 3 and a generally cylindrical sleeve or annular peripheral zone 4 of breeder material. Such breeder zones are also known as blanket zones, and the breeder material can consist of U-238. The division of the reactor into individual zones is produced by suitably inserting into the conventional non-illustrated reactor frame, rod-shaped fuel elements 5 and 5' (FIG. 3) having respectively shorter lengths 1 and longer lengths 2 of thermally fissionable fuel 1 such as U-235, U-233 or plutonium in some chemical form and accordingly longer and shorter lengths of breeder or blanket material 3 such as U-238 or thorium, in some chemical form as shown in FIGS. 3a and 3b. The annular zone 4 is made up of rod-shaped elements 5'' formed of breeder material, generally, without or with very little amounts of fissionable fuel. Since the individual fuel elements 5, 5' of the reactor can contain a large number of relatively thin fuel rods (not shown), practically any constant reduction in the height or thickness in the axial direction of the fissionable nuclear fuel zone 1 proper (see FIG. 2) can be achieved. From a practical viewpoint it should however be preferable to provide a step-type arrangement of the fissionable fuel zones 1 and 2 according to the embodiment of FIG. 3 because, thereby, substitution or replacement of the fuel element within a zone of the same height or axial thickness of the fissionable fuel is possible and fewer types of fuel rods having varied distribution or lengths of breeder and fissionable materials must be provided.

As shown diagrammatically in FIG. 3, coolant, such as steam or liquid metal, is circulated through suitable passages provided in the core in a conventional manner.

For further illustration of the geometric construction of the fast-breeder reactor of my invention, the data for a power reactor of 2500 megawatts thermal are given hereinafter.

Figure 4:
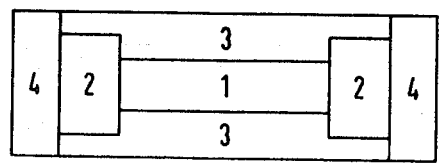
FIG. 4 is a diagrammatic view of a reactor constructed according to my invention similar to the embodiment of FIG. 3 though having fissionable fuel and breeder material zones of different relative dimensions.

The geometric construction with respect to the shape of the fissionable fuel and breeder material zones is readily apparent from the diagrammatic view of the reactor embodiment shown in FIG. 4. The fissionable fuel zones and the axial and radial breeder material zones are identified in FIG. 4 by the same corresponding reference numerals employed in FIGS. 2 and 3. In the example of FIG. 4, the thickness i.e., the elevational dimension as shown in FIG. 4, of the fissionable fuel zone 1 was 47 cm and the radial length thereof i.e., the distance from the center of the fissionable fuel zone 1 to either end thereof, was 100 cm. The thickness i.e., the elevational dimension in FIG. 4, of the graduated fissionable fuel zone 2 was 94 cm while the outer radius thereof from the center of the fissionable fuel zone 1 was 158 cm. The combined thickness or elevational dimension of the reactor core in FIG. 4, i.e., of both the fissionable fuel zones and breeder material zones was 139 cm while the radius thereof was 203 cm.

Figure 5:
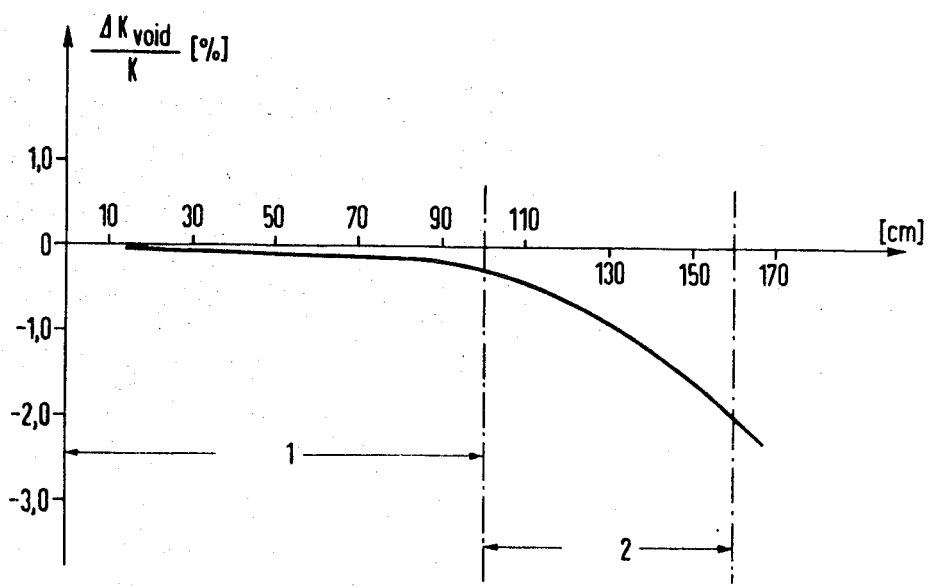
FIG. 5 is a graph, wherein percentage of incremental coolant void effect is plotted against radial distance from the core center, showing the principal reactivity curve of the fast-breeder reactor of this invention.

The aforementioned thermal power arises essentially in the fissionable fuel zones 1 and 2, only 100 megawatts thermal being removed from the breeder zones or blankets 3 and 4. The mean power density for the reactor of my example was 408 kilowatts per liter, the efficiency of the plant 40 percent. The degree of enrichment in both fissionable fuel zones 1 and 2 was the same. The result of the void effect is apparent from FIG. 5, when reference is made to FIG. 1 as a comparison therewith wherein there is shown the principal reactivity curve of a known disc-shaped fast-breeder reactor subjected to uniform coolant losses.

As in the embodiment of FIG. 3, the fuel elements in the reactor of FIG. 4 extend over the entire elevation of the reactor core, the division thereof into the individual zones being effected by suitably arranging fuel rods having correspondingly longer or shorter sections of breeder material and/or fissionable fuel content within the respective fuel elements.

Figure 6:
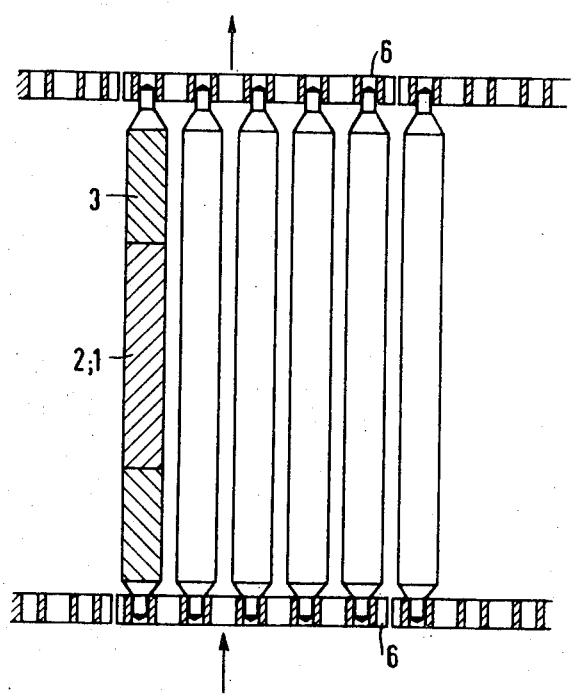
FIG. 6 is a diagrammatic, partly longitudinal sectional view of several fuel elements of the invention.

As shown in FIG. 6, the fuel elements employed in the fast-breeder reactor of my invention have a laterally open construction, the fuel rods of each fuel element being held together in suitably perforated end plates 6 and spacers, there being no enclosing wrapper tubes for the fuel rods extending between the end plates 6. Thus, a uniform grid or perforated plate structure is able to be provided for all of the fuel rods of the various fuel elements over the cross section of the reactor.

It has also been found that the temperature gradient over the cross section of the fuel element for most of the fuel elements in the reactor core is considerably smaller than for a normal conventionally known disc-shaped cylinder core. By providing a finer graduation in the elevational dimension, a further reduction of these temperature gradients can be attained.

Due to the uniform enrichment of the fissionable fuel and the uniform power density distribution, it can be expected that, with the reactor construction of my invention, there is little change in the power density distribution with increasing burn up and formation of plutonium in the breeder material blankets, and rather, a further linearization is effected. The temperature gradients over the cross section of a respective fuel element is thereby further reduced so that the mean coolant temperatures rise.

As a mathematically calculated check of this reactor construction of my invention has shown, for a predetermined maximal void effect, there is obtainable an optimum with respect to the fissionable fuel inventory, the breeding ratios, the long-term behavior and altogether therewith the general economy of a fast-breeder reactor. With such a construction as that of my invention, the demands made on a fast-breeder reactor with regard to economy and safety are reduced to a common denominator.

According to my invention, the neutron leakage losses are increased substantially only in the center of the fissionable zone and not in the marginal regions thereof, such as occurs in the so-called pancake core.

An advantage deriving from my improved invention, in addition to the simplification of the production of the fuel elements which are provided with only a single degree of enrichment when pellets are used therein, is that a marked linearization of the power density distribution is produced within the reactor core. A further consequence thereof is that the temperature gradient over a cross section of a fuel element i.e., the difference in temperature between the sides of the fuel element support structure facing toward and away from the axis of symmetry of the reactor core, is greatly reduced and is made uniform over the multiplicity of fuel elements so that stressing and warping of the major part of the fuel elements need hardly be feared any more.

It is possible to devise a core geometry that is optimal with regard to the power distribution for the axial cooling channels. This is close to the core geometry, however, which represents an optimum with respect to the void effect. Thus, from the practical view, both of these objectives can be attained with adequate approximation with one reactor core layout.

When laterally open fuel elements are employed, the heating stress in the individual flow paths of the coolant in the various radially extending regions of the reactor core is substantially uniform. The orifices usually required at the coolant inlet when laterally closed fuel elements, especially, are employed, are therefore superfluous when these laterally open fuel elements are used. Thus a practically uniform coolant outlet temperature is consequently produced at the upper end of the reactor core whereby efficiency and economy of the power plant is increased. Furthermore, the use of laterally open fuel elements is advantageous over the use of laterally closed fuel elements from nuclear-physical viewpoints of neutron absorption.

I claim:

1. Fast-breeder nuclear reactor comprising a generally cylindrical reactor core having axial end zones of breeder material and a center zone of fissionable fuel, and means for cooling said zones with fluid coolant, both said zones being defined by a mutually parallel assembly of rod-shaped fuel elements having end portions of breeder material and a center portion of fissionable fuel material, said fissionable fuel zone having end surfaces located in opposite axial directions of said cylindrical core symmetrical to a transverse plane through said core bisecting said fissionable fuel zone, said fissionable fuel zone having a thickness in the axial direction of said core reducing in radial direction toward the axis of said core and having a uniform density of fissionable fuel.

2. Reactor according to claim 1, wherein said reactor core includes an annular peripheral zone of breeder material surrounding said fissionable fuel zone.

3. Reactor according to claim 2, wherein said thickness of said fissionable fuel zone reduces substantially constantly in radially inward direction.

4. Reactor according to claim 2, wherein said thickness of said fissionable fuel zone reduces step-wise in radially inward direction.

5. Reactor according to claim 2, wherein said peripheral zone is defined by an assembly of rod-shaped elements of breeder material.

6. Reactor according to claim 1 wherein the fissionable fuel has a uniform degree of enrichment.

7. Reactor according to claim 2 wherein said fuel elements have the breeder material and the fissionable fuel material thereif directly exposed to said fluid coolant.

8. Reactor according to claim 7 wherein said fuel elements are equally spaced from one another.

9. Reactor according to claim 8 wherein said fuel elements are formed of parallel fuel rods secured to one another by spacers at the ends thereof.

10. Reactor according to claim 9 wherein the fuel rods of said fuel elements are substantially equally spaced from one another throughout said reactor core.

* * * * *